United States Patent
Roethel et al.

(10) Patent No.: US 6,908,071 B2
(45) Date of Patent: Jun. 21, 2005

(54) SELF-CLOSING FAUCET WITH SHEARING ACTION

(75) Inventors: Henry G. Roethel, Ravenna, OH (US); Michael H. Meyer, Sagamore Hills, OH (US); Raymond P. Kawolics, Solon, OH (US)

(73) Assignee: The Meyer Company, Cleveland, OH (US)

( * ) Notice: Subject to any disclaimer, the term of this patent is extended or adjusted under 35 U.S.C. 154(b) by 0 days.

(21) Appl. No.: 10/677,544

(22) Filed: Oct. 2, 2003

(65) Prior Publication Data

US 2004/0144944 A1 Jul. 29, 2004

Related U.S. Application Data

(60) Provisional application No. 60/493,210, filed on Aug. 6, 2003, provisional application No. 60/426,131, filed on Nov. 14, 2002, and provisional application No. 60/415,664, filed on Oct. 3, 2002.

(51) Int. Cl.[7] .............................................. F16K 31/524
(52) U.S. Cl. ...................................... 251/238; 251/325
(58) Field of Search ................................ 251/237, 238, 251/239, 240, 241, 242, 243, 244, 245, 246, 325; 222/509, 518, 525

(56) References Cited

U.S. PATENT DOCUMENTS

| | | | | |
|---|---|---|---|---|
| 691,569 A | * | 1/1902 | Pohlman | 251/246 |
| 772,668 A | * | 10/1904 | O'Brien | 251/244 |
| 1,490,227 A | * | 4/1924 | Osborn | 251/263 |
| 2,745,628 A | * | 5/1956 | Carlson | 251/246 |
| 2,969,923 A | * | 1/1961 | Fremion | 251/325 |
| 3,026,907 A | * | 3/1962 | Klingler | 251/325 |
| 3,173,579 A | | 3/1965 | Curie et al. | |
| 3,415,454 A | * | 12/1968 | Bucknell et al. | 251/245 |
| 3,523,549 A | * | 8/1970 | Anderson | 251/279 |
| 3,588,040 A | * | 6/1971 | Ward | 251/244 |
| 4,381,099 A | * | 4/1983 | Knedlik | 251/325 |
| 4,548,343 A | * | 10/1985 | Gotch | 222/518 |
| 4,572,411 A | * | 2/1986 | Dreibelbis | 222/525 |
| 4,742,851 A | * | 5/1988 | Lundblade | 251/347 |

* cited by examiner

*Primary Examiner*—Eric Keasel
(74) *Attorney, Agent, or Firm*—Fay, Sharpe, Fagan, Minnich & McKee, LLP (57) ABSTRACT

A faucet includes a body having a main bore including an inlet and an outlet. A bonnet and spout are connected to the body. A stem includes a first portion inserted into the outlet of the main bore and a second portion that projects through the bonnet chamber to a distal end. The first portion of the stem comprises a flow path and the stem is slidably movable relative to the body and bonnet between a first position and a second position. A seal is carried by the stem and is engaged with the stem and sealing face when the stem is located in the first position. The seal is spaced from the sealing face when the said stem is moved to the second position. A handle is operably connected to the distal end of the second portion of the stem. A spring biases the stem to the first position.

14 Claims, 12 Drawing Sheets

SELF-CLOSING FAUCET WITH SHEARING ACTION

CROSS REFERENCE TO RELATED APPLICATIONS

This applications claims priority from and benefit of the filing date of the following U.S. provisional applications: Ser. No. 60/415,664 filed Oct. 3, 2002; Ser. No. 60/426,131 filed Nov. 14, 2002; and, Ser. No. 60/493,210 filed Aug. 6, 2003, and all of these provisional applications are hereby expressly incorporated by reference into this specification.

BACKGROUND OF THE INVENTION

A wide variety of faucets for dispensing liquids from containers such as coffee urns, juice containers, iced tea containers and the like are well known and in widespread use. In a typical arrangement, a resilient seat cup or other flexible sealing member is biased into sealing engagement with a valve seat. The seat cup or other sealing member is selectively deformed or otherwise moved away from the valve seat to allow liquid flow therepast.

When liquids include suspended solids (e.g., juice containing pulp), it is possible for the solids to accumulate adjacent the valve seat and/or on the seal member, itself. These accumulated solids can interfere with proper sealing engagement between the sealing member and valve seat and are otherwise generally undesirable.

In certain applications, it is highly desirable to minimize contact between the liquid being dispensed and the sealing member to prevent the sealing member from imparting any taste to the liquid. This can occur when the liquid sits in the container/faucet for a prolonged period between dispensing occurrences.

Furthermore, in conventional faucets, a high quality seat cup or other sealing member defined from silicone or the like adds significant cost to the faucet. As such, it is desirable to minimize the mass of the sealing member to reduce the cost of the faucet and replacement seal members.

A need has also been identified for a faucet that overcomes the above-noted deficiencies and others while also providing self-closing action.

SUMMARY OF THE INVENTION

In accordance with an aspect of the present invention, a faucet comprises: a body comprising: (i) a main bore; and, (ii) a sealing face; a stem comprising a first portion that defines a flow path, wherein said flow path communicates with said main bore, said stem being slidable between first and second positions relative to said body; a seal that moves with said stem between said first and second positions, wherein said seal engages said sealing face of said body when said stem is located in said first operative position to block liquid flow from said main bore of said body and from said flow path, and wherein said seal is spaced from said sealing face when said stem is located in said second position to allow liquid flow from said flow path and said main bore; a biasing element that resiliently biases said stem into said first position; and, a handle operably engaged with said stem to receive manual input force, wherein said stem is movable in response to movement of said handle.

In accordance with another aspect of the present invention, a faucet comprises: a body comprising a main bore and a valve seat; a bonnet connected to said body and defining a chamber; a spout comprising a dispensing bore having an inlet and an outlet, said inlet of said dispensing bore located downstream relative to said valve seat; a stem at least partially located in said chamber of said bonnet, said stem comprising a first portion that is slidably engaged with said body, said stem movable between a first position and a second position and further comprising a second portion that projects outwardly from said first portion, said second portion of said stem comprising a distal end located external to said chamber of said bonnet; a seal engaged with said stem and movable therewith when said stem moves between said first and second positions, wherein said seal is mated with said valve seat of said body when said stem is located in said first position to block fluid flow past said valve seat, and wherein said seal is spaced from said valve seat when said stem in located in said second position to allow fluid flow past said valve seat to said inlet of said dispensing bore; a spring that normally biases said stem to said first position; and, a handle operably engaged with said distal end of said second portion of said stem, wherein said handle is manually movable to move said stem from said first position to said second position.

In accordance with another aspect of the present invention, a faucet comprises: a body defining a main bore and a valve seat; a bonnet connected to said body and defining a chamber; a spout comprising a dispensing bore that is in communication with said chamber; a stem that is slidably movable relative to said body between first and second positions, said stem comprising a portion that extends through said chamber of said bonnet and that terminates in a distal portion located external to said chamber; a handle operably engaged with said distal portion of said stem, wherein said handle is manually movable to control movement of said stem between said first and second operative positions; a seal member movable with said stem, said seal member mated with said valve seat when said stem is located in said first position and spaced from said valve seat when said stem is located in said second position, wherein said seal member blocks fluid flow from said main bore to said dispensing bore when said stem is located in said first position and said seal is mated with said valve seat.

In accordance with another aspect of the present invention, a faucet comprises: a body comprising a main bore including an inlet and an outlet, said body defining a sealing face that surrounds said outlet of said main bore; a bonnet connected to said body and defining a chamber; a spout comprising a dispensing bore located downstream from said outlet of said main bore and in communication with said chamber of said bonnet; a stem including a first portion that is inserted into said outlet of said main bore and a second portion that projects through said chamber of said bonnet to a distal end located external to said chamber of said bonnet, said first portion of said stem comprising a flow path, wherein said stem is slidably movable relative to said body and said bonnet between a first position wherein said flow path of said stem is fully inserted into said main bore, and a second position wherein a portion of said flow path is located external to said main bore; a seal carried by said stem and sealingly engaged with said stem and said sealing face when said stem is located in said first position to block fluid flow from said main bore to said dispensing bore via said flow path, wherein said seal is spaced from said sealing face when said stem is moved to said second position to allow fluid flow from said main bore to said dispensing bore; and, a actuator handle operably connected to said distal end of said second portion of said stem and manually movable to effect movement of said stem from said first position to said second position.

BRIEF DESCRIPTION OF DRAWINGS

The development comprises various components and arrangements of components, preferred embodiments of which are illustrated in the accompanying drawings that form a part hereof and wherein.

DETAILED DESCRIPTION OF PREFERRED EMBODIMENTS

Figure 1A:
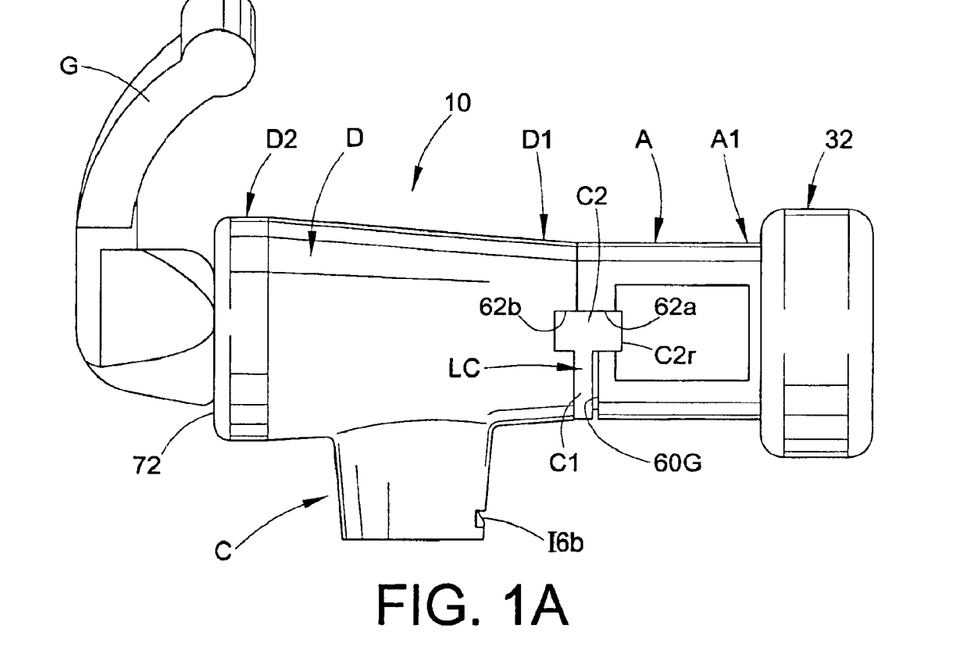
FIGS. 1A and 1B are respective left and right side elevational views of a faucet formed in accordance with the present invention.
Figure 1B:
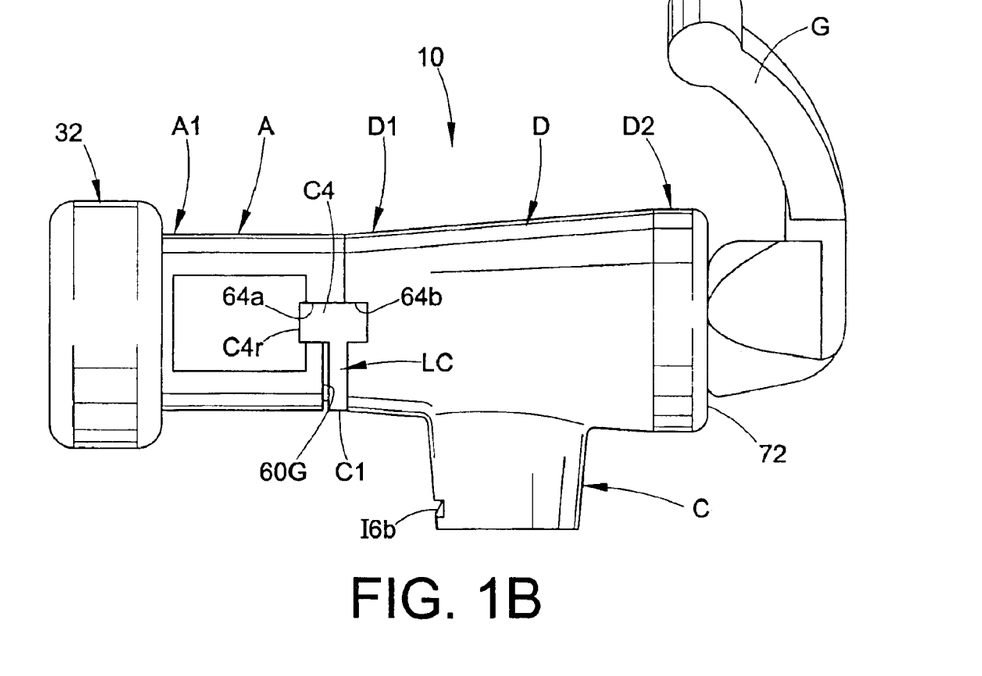
Figure 2A:
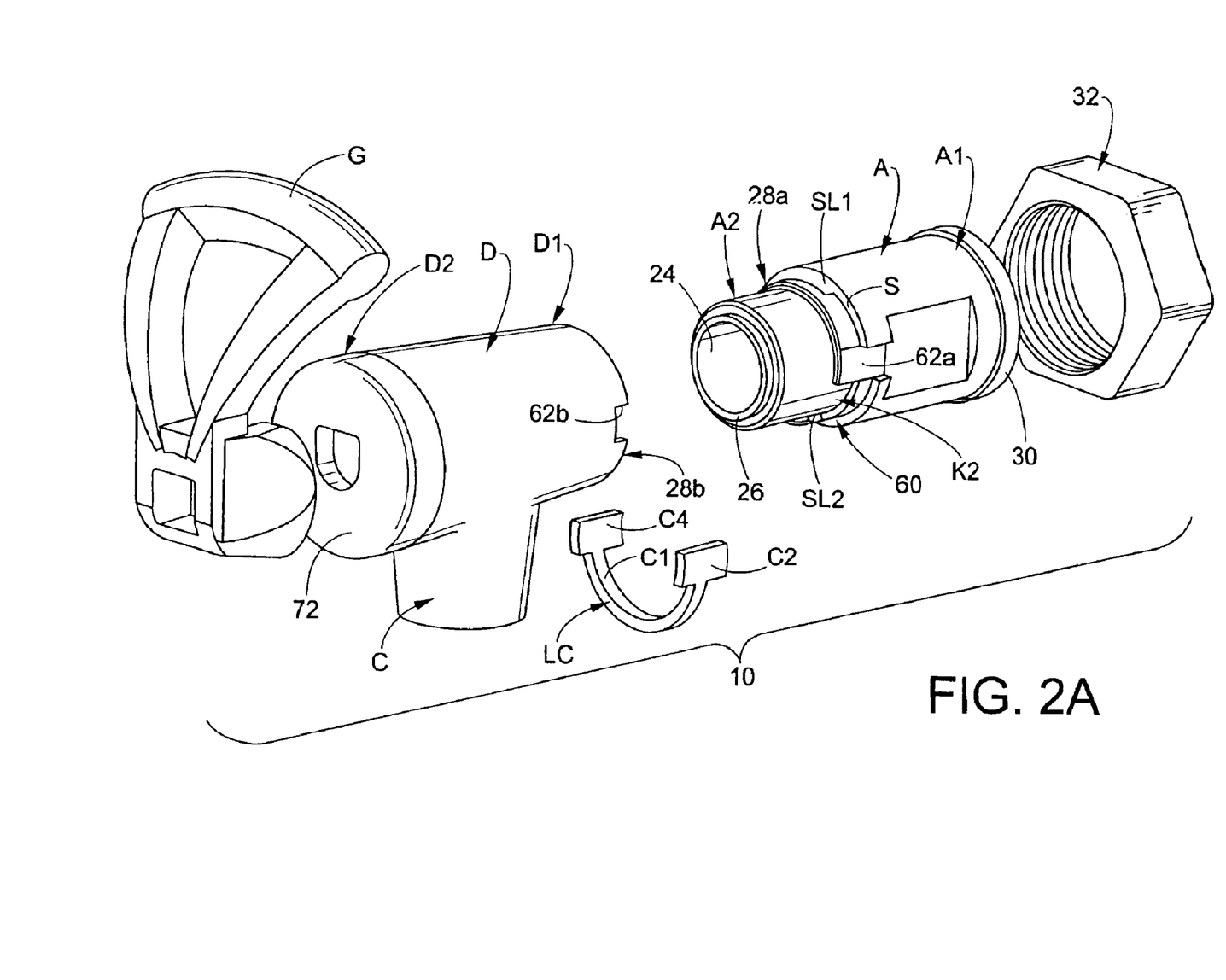
FIGS. 2A and 2B are exploded isometric views of the faucet shown in FIGS. 1A and 1B, showing left and right sides thereof, respectively (a stem of the faucet is not shown in these views)
Figure 2B:
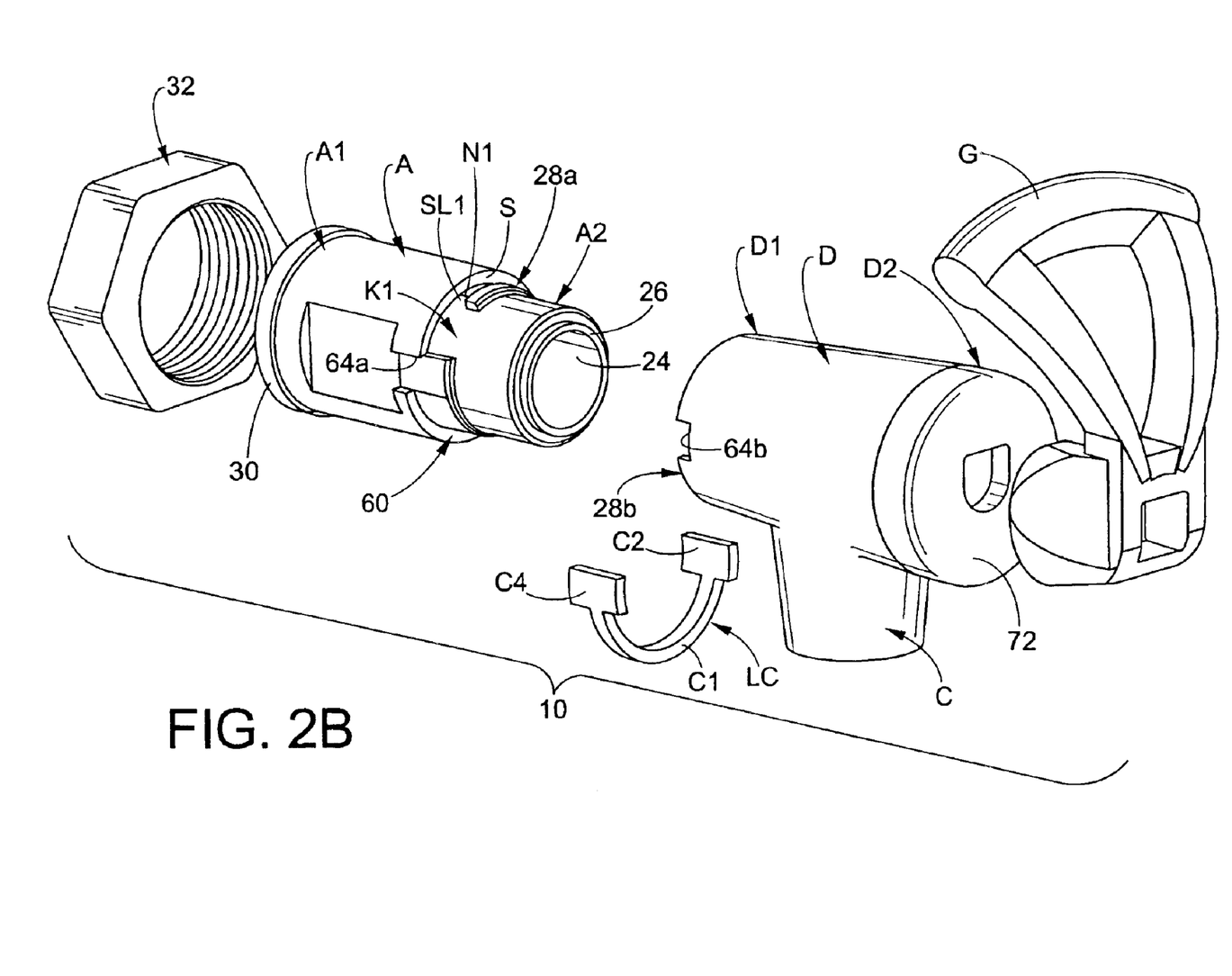

Referring to FIGS. 1A, 1B, 2A and 2B, a self-closing faucet with shear action is illustrated generally at 10 (a stem of the faucet is not shown in FIGS. 2A and 2B to simplify these views). Among other components described below, the faucet 10 comprises a body A and a bonnet D connected to the body A.

The body A (also shown separately in FIG. 3A) has a first end A1 configured to mate with an urn or other liquid-holding container or conduit in a fluid-tight manner. The body A comprises a second end A2 that defines or otherwise includes a male portion of a bayonet mount 28a. The bonnet D (shown separately in FIG. 3B) defines or otherwise includes a female bayonet mount 28b that selectively mates with the male bayonet mount 28a of the body A for interconnection of the body A and bonnet D as shown in FIGS. 1A and 1B.

Figure 3A:
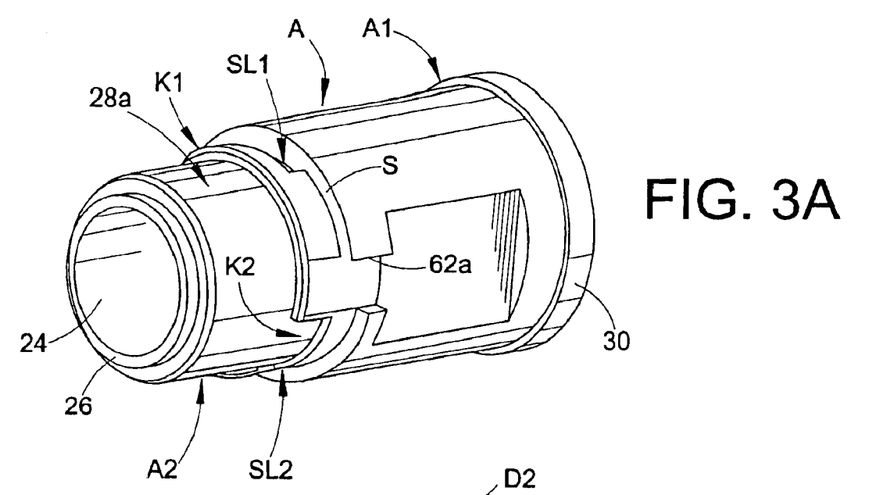
FIG. 3A is an enlarged isometric view of the body portion of the faucet shown in FIGS. 1A and 1B.
Figure 3B:
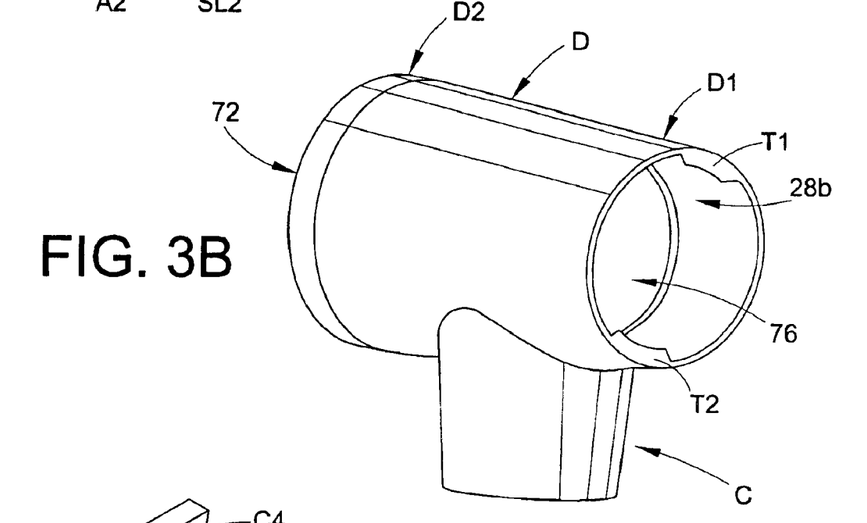
FIG. 3B is an enlarged isometric view of the bonnet portion of the faucet shown in FIGS. 1A and 1B.
Figure 4A:
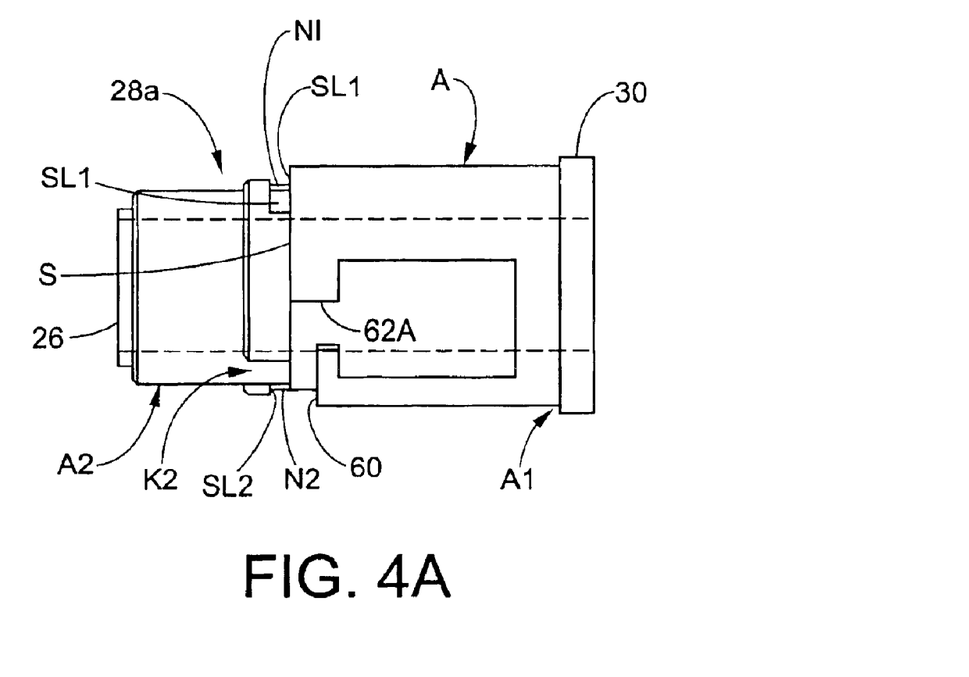
FIG. 4A is a side elevational view of the body portion of the faucet shown in FIGS. 1A and 1B.

As best seen in FIGS. 3A,3B, the female bayonet mount 28b comprises first and second tabs T1,T2 (FIG. 3B) that are respectively received axially into first keyways K1,K2 (FIG. 3A) of the male bayonet mount 28a when the bonnet D is mated to the body A (see also FIGS. 2A,2B). When the bonnet D is moved axially into abutment with a shoulder S of the body A, the bonnet D is then rotated relative to the body so that the tabs T1,T2 thereof move into first and second circumferential slots SL1,SL2 (see also FIG. 4A) to prevent axial separation of the bonnet D from the body A. With reference to FIGS. 2B and 4A, a nib N1 projects outwardly from the body A adjacent the intersection of the keyway K1 and slot SL1, and the tab T1 must move resiliently over the nib N to move into and out of the slot SL1. Likewise, a nib N2 (FIG. 4A) projects outwardly from the body A adjacent the intersection of the keyway K2 and slot SL2, and the tab T2 of the female bayonet mount 28b must move resiliently over the nib N2 to move into and out of the slot SL2. Thus, the nibs N1,N2 interact with tabs T1,T2, respectively, to provide a detent mechanism that inhibits undesired decoupling of the bonnet D from the body A and that also provides a user with a tactile feedback during assembly that proper interconnection of the body A and bonnet D has been effected.

Figure 3C:
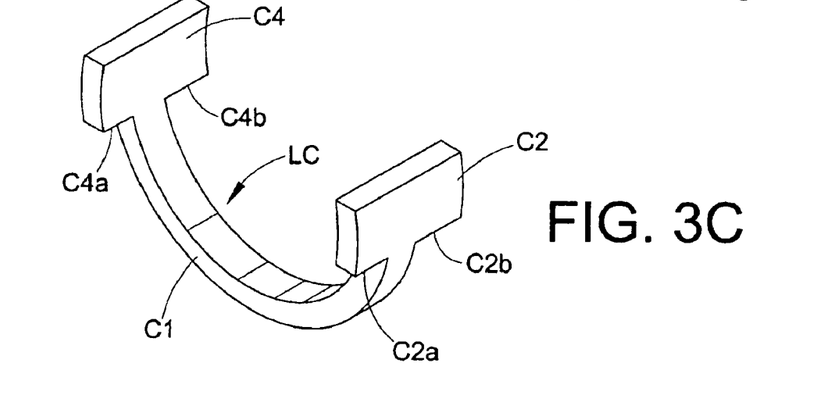
FIG. 3C is an enlarged isometric view of the locking clip portion of the faucet shown in FIGS. 1A and 11B.

Referring again to FIGS. 1A–2B, the faucet 10 further comprises a locking clip LC that is selectively connected to the faucet 10 at the interface of the body A and bonnet D to prevent undesired or unintended rotation between these components A,D as could lead to decoupling thereof at the bayonet mount 28a, 28b. The locking clip LC is shown separately in FIG. 3C and comprises a one-piece molded plastic or metal construction that includes a central arcuate or cylindrical band C1 having first and second enlarged opposite ends C2,C4. In the illustrated embodiment, the ends C2,C4 define a T-shaped conformation on the respective ends of the band C1. The first enlarged end C2 comprises first and second transverse tabs or legs C2a,C2b. The second enlarged end C4 comprises first and second transverse tabs or legs C4a,C4b.

FIG. 4A shows that the male bayonet mount portion 28a of body A is conformed with a recess 60 adapted to receive the band portion C1 of the locking clip LC upon assembly as shown in FIGS. 1B and 1B. Furthermore, the male bayonet mount portion 28a comprises first and second notches 62a, 64a located at opposite ends of the recess 60 (see FIGS. 2A and 2B). Correspondingly, the female portion 28b of the bayonet mount as defined by bonnet D comprises first and second notches 62b,64b that are respectively aligned with the notches 62a, 64a when the body A and bonnet D are operatively coupled. Also, when the body A and bonnet D are operatively coupled via bayonet mount 28a,328b, a groove 60G (FIGS. 1A,1B) is defined between these two components owing to the presence of the recess 60 defined in body A.

As such, when the body and bonnet A,D are operative coupled as shown in FIGS. 1A and 1B, the locking clip LC is resiliently expanded and installed onto the faucet 10, with the band portion C1 thereof closely and firmly received in the groove 60G. The enlarged first end C2 of clip C seats in a space defined by the aligned notches 62a, 62b, and the enlarged second end C4 of clip C seats in a space defined by the aligned notches 64a,64b. Owing to the one-piece resilient structure of the clip LC, the clip is firmly and closely received in the position just described and shown in FIGS. 1A,1B. This operative installation of the clip LC prevents unintended relative rotation between the body A and bonnet D as would lead to undesired decoupling of these components. More particularly, the enlarged ends C2,C4 of clip C, when seated in the spaces defined by aligned notches 62a,62b and 64a,64b, respectively, span the joint defined between the body and bonnet A,D and are engaged with both of these components to prevent relative rotation therebetween.

The locking clip LC is expanded and removed when decoupling of the bonnet D from the body A is desired. It is preferred that the enlarged ends C2,C4 of clip define respective rear edges C2r,C4r that overhang a portion of the body A and provide a location for engagement by a blade or other tool to facilitate resilient expansion and removal of the clip LC.

Although the body A and bonnet D are illustrated herein as being coupled via bayonet mount 28a,28b, those of ordinary skill in the art will recognize that any other suitable coupling means or structure can be used for operatively coupling the bonnet D to the body A. In one alternative embodiment, the body A and bonnet D include mating threads and are threadably coupled. In another embodiment, the bonnet D is affixed to the body A with a friction fit, snap-fit or through use of an adhesive. Unless otherwise recited in a claim, it is not intended that the invention be limited to a particular structure or means for operatively coupling the bonnet D to the body A. The bonnet D and body A can also be integrated and/or defined as a one-piece construction.

Figure 5A:
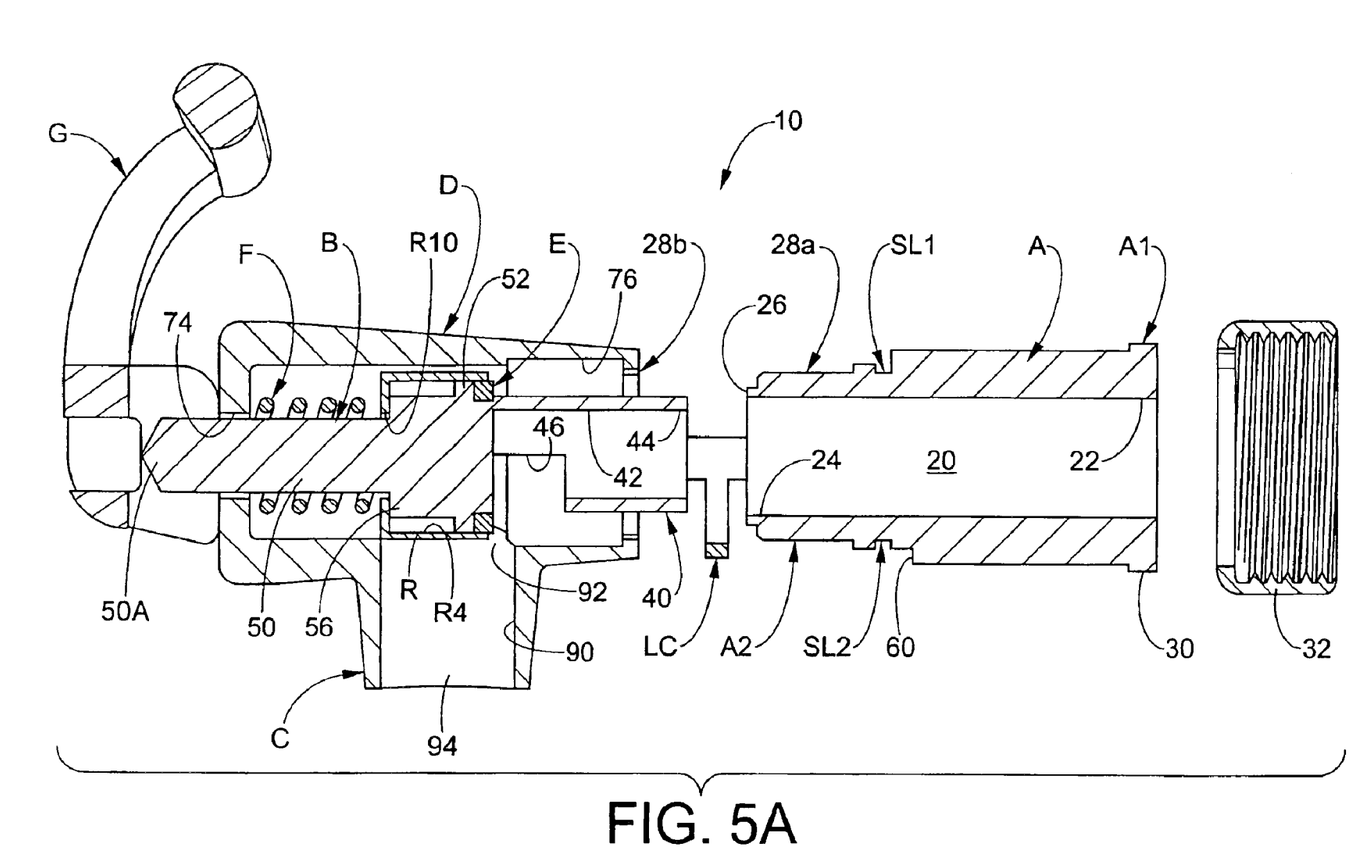
FIG. 5A is an exploded left side sectional view of the faucet shown in FIGS. 1A and 1B.
Figure 5B:
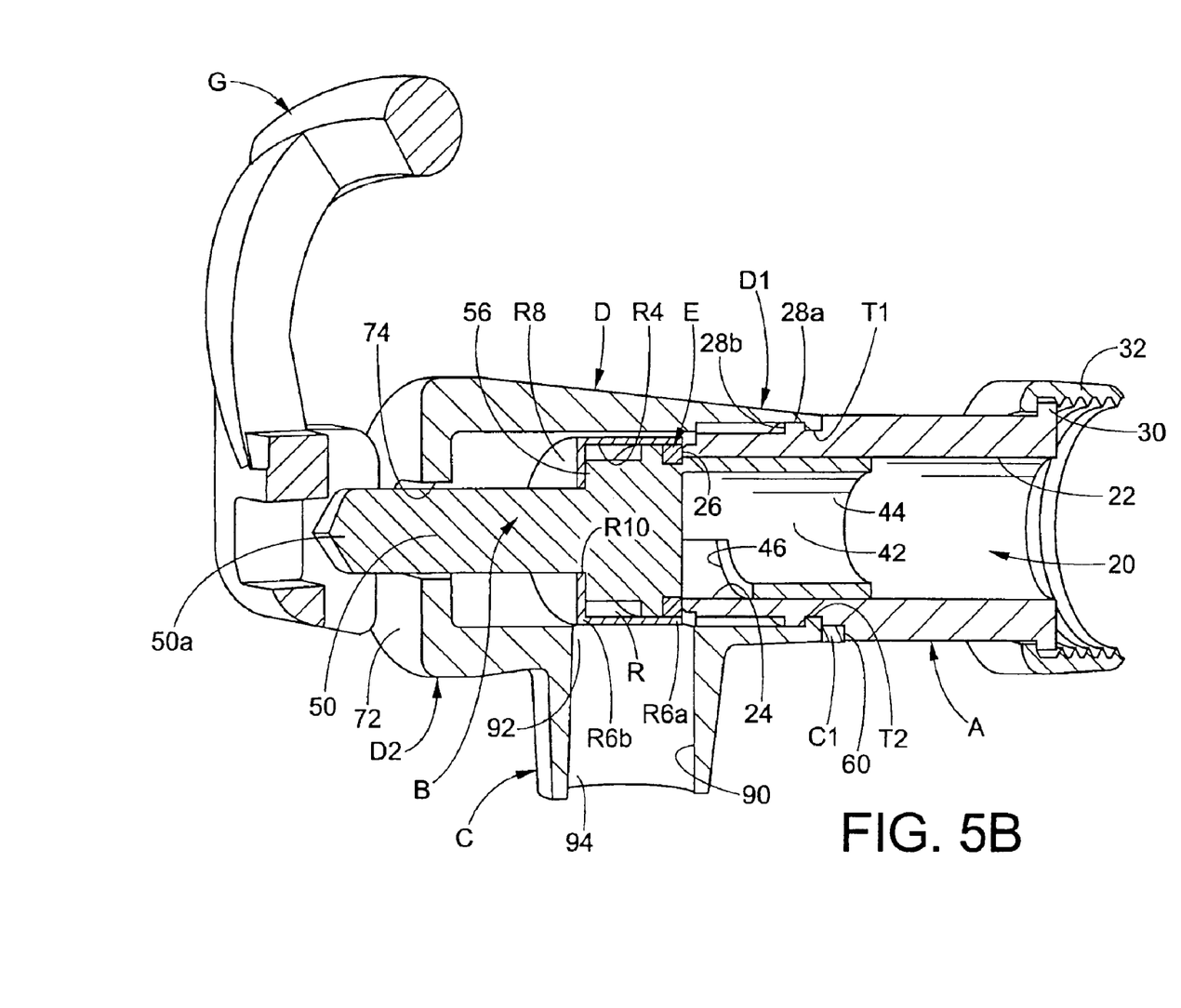
FIG. 5B is a sectional isometric view of the faucet shown in FIGS. 1A and 1B.

FIGS. 5A and 5B show sectional views of a faucet 10 formed in accordance with the present invention. In addition to the body A and bonnet D described above, the faucet comprises: a stem B, a seal member E, a biasing member F (shown in FIG. 5A but omitted from FIG. 5B for clarity) and a handle G. The faucet further comprises a spout C that, in the illustrated embodiment, is defined as a one-piece construction with the bonnet D, but it need not be.

The body A is preferably defined from molded polymeric material or the like or metal (e.g., stainless steel, brass, aluminum, etc.), and includes the first end A1 and second end A2 as described above. A main bore 20 extends between and through the first and second ends A1,A2 so that an inlet 22 to the main bore 20 is defined at the first end A1 and an outlet 24 from the bore 20 is defined at the second end A2. The second end A2 of the body A, adjacent the outlet 24, defines a sealing face or valve seat 26 that is preferable circular.

As described above, the second end A2 body A is adapted to be coupled to the bonnet D. The first end A1 of the body A is configured to mate with an urn, or other container of liquid or conduit in a fluid-tight manner as is generally known in the art. In the illustrated embodiment, the first end A1 includes or defines a flange 30, and a nut 32 is rotatably carried by the body A and is captured on the second end A2 of the body by the flange 30, i.e., the nut 32 defines an inside diameter that is less than an outside diameter of the flange 30. The nut 32 is threadably secured to a mating outlet fitment of an urn or other container or conduit in a manner so that the inlet 22 of bore 20 is mated in fluid communication with an outlet of the fitment so that liquid flows from the urn or other source into the bore 20. The bore 20 is preferably cylindrical.

Figure 4B:
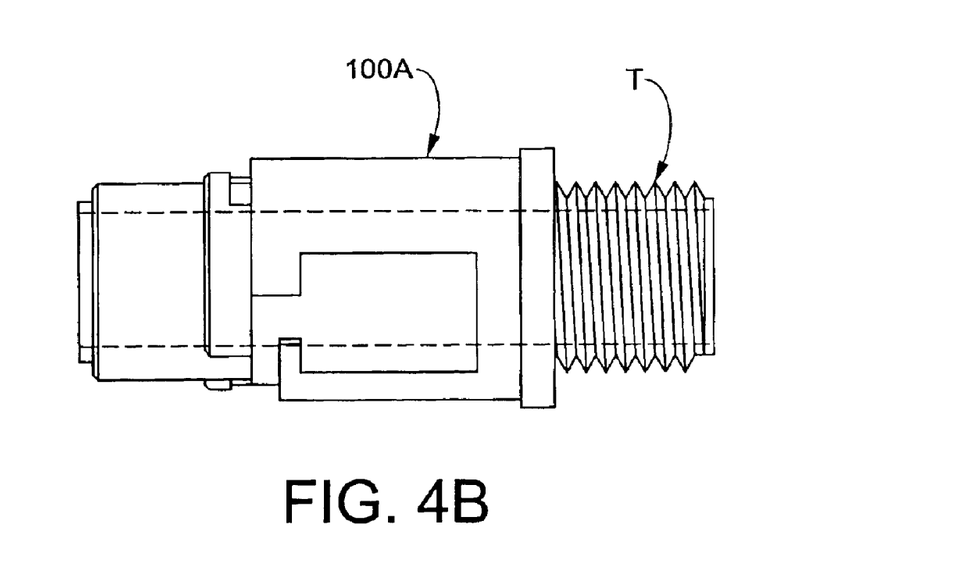
FIG. 4B is a side elevational view of an alternative body portion of the faucet shown in FIGS. 1A and 1B.

FIG. 4B shows an alternative body 100A that is identical to the body A except that the first end A1 of the body 100A includes male or female threads T that allow for direct connection to an associated urn or other container or conduit. In one example, a separate nut advanced onto the threads T after the threaded portion is inserted through an opening defined an urn or other container. In another example, the urn or container of conduit includes an outlet fitment having threads that mate with the threads T.

Referring again to FIGS. 5A and 5B, the stem B (illustrated separately in FIG. 5C) includes a first portion 40 that is closely and slidably received in the bore 20 via outlet 24. The first portion 40 is preferably minimally smaller than and shaped to conform to the outlet 24 and bore 20 to minimize any space between the first portion 40 of stem B and the body A.

Figure 5C:
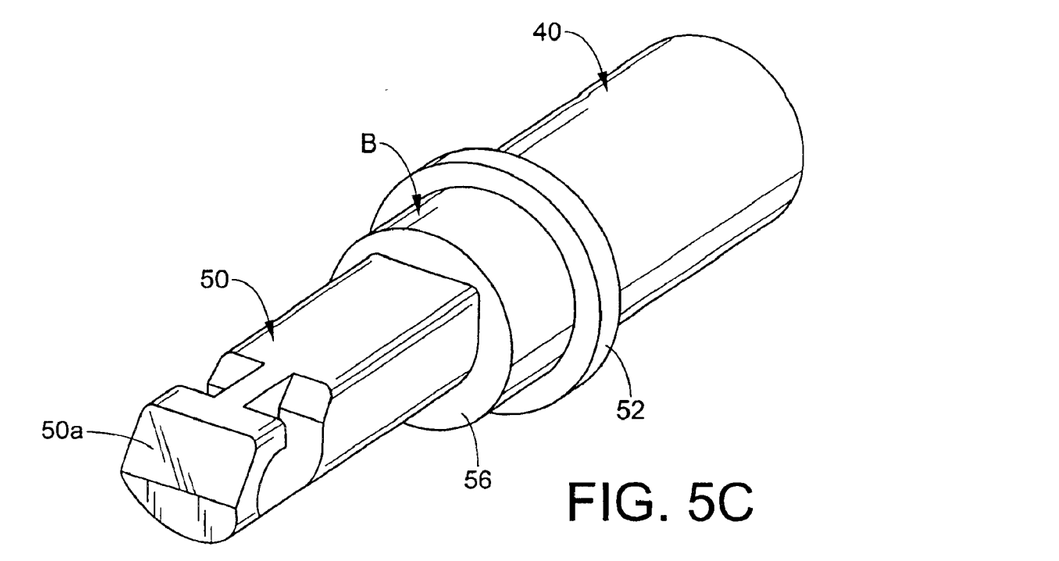
FIGS. 5C and 5D are isometric views of the stem and retainer components of the faucet shown in FIGS. 1A and 1B.

The first portion 40 of stem B defines flow path such as a bore 42 including an inlet or first end 44 that communicates with the main bore 20 of body A. A radial aperture 46 is defined in the male portion 40 and intersects the bore 42 and, thus, defines or provides an outlet or second end of the of the flow path 42. Those of ordinary skill in the art should note that the inlet and outlet 44,46 of the flow path 42 can be joined by an open slot and need not be separate from each other. For example, the outlet opening 46 can extend axially entirely from the inlet 44 to the seal E. In another example, the flow path 42 is defined by one or more grooves defined in the first portion 40 of stem B so that liquid flows between the first portion 40 and the portion of body A defining the main bore 20. In another example, the first portion 40 defines an X-shaped cross-section or the like. It is not intended that the structure of the flow path 42 of stem be limited to the exact arrangement shown. The first portion 40 slidably supports the stem B relative to the body A while allowing liquid flow through the main bore 20 of body A under certain conditions described below.

The stem B further includes a second portion such as an actuator rod 50 connected to the first portion 40 and having a distal end 50a that projects outwardly away from the first portion 40. The rod 50 is connected to and/or is formed as a one-piece construction with the first portion 40 as shown herein. More particularly, as shown herein, the stem B is a one-piece molded polymeric construction.

The stem B further comprises a stop flange 52 that extends radially outward at a location between the rod 50 and the male portion 40. The stop flange 52 defines a diameter or size that is larger than the seat 26 of body A and, thus, acts as a stop that limits insertion of the male portion 40 into the bore 20 of body A. A shoulder 56 is defined between the stop flange 52 and the distal end 50a of rod 50 for reasons described below.

The seal member E is preferably defined by one or more elastomeric O-rings or elastomeric flat washers. The seal member E is a one-piece annular member that encircles the male portion 40 of the stem B and abuts the stop flange 52. The elastomeric seal E can be defined from materials such as, e.g., EPDM, Silicone, a thermoplastic elastomer (TPE). The seal E is frictionally, adhesively or otherwise engaged with the male portion 40 and/or stop flange 52 of stem 300B so that the seal E moves axially with the male portion 40 as described below.

Figure 5D:
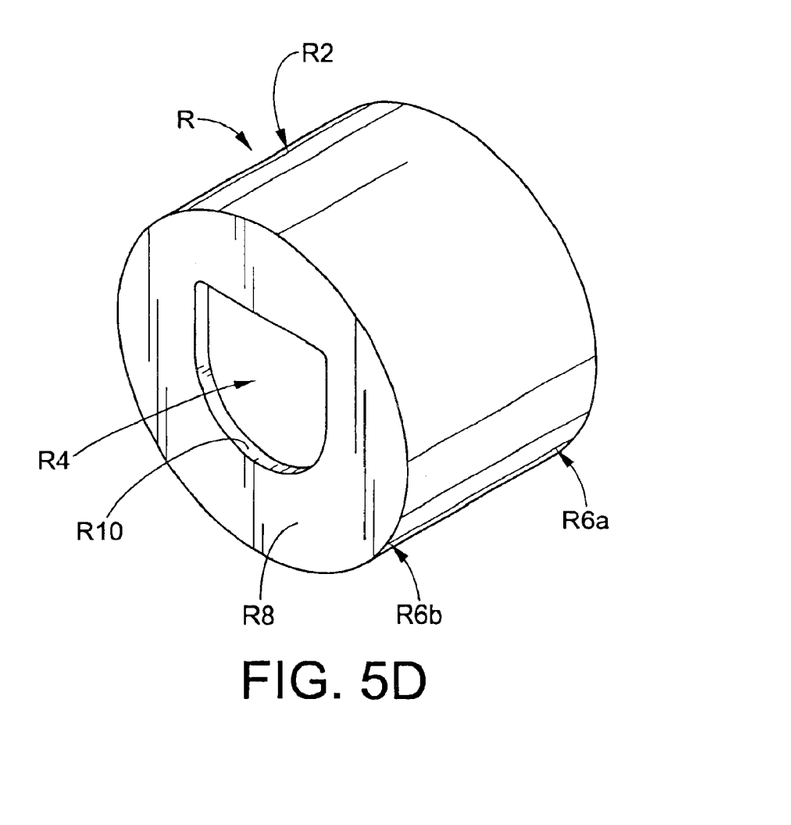

The faucet 10 further comprises a seal retainer R that is also shown separately in FIG. 5D. The seal retainer R comprises a cylindrical body R2 defining a cylindrical recess R4 that extends between first and second axial ends R6a,R6b of the body R2. The cylindrical recess R4 is open at the first end R6a of the body, and an end wall R8 closes the recess R4 at the second end R6b, except for an aperture R10 defined therethrough.

As shown in FIGS. 5A and 5B, the seal retainer R is installed in the faucet 10, coaxially relative to the stem B, so that the end wall R8 of the retainer abuts the shoulder 56 of stem B and so that rod 50 of the stem extends through the recess R4 and aperture R10. The stop flange 56 is closely received in the recess R4 with minimal clearance. The seal E is at least partially received in the recess R4 and can be completely received in the recess R4 so that the retainer body R2 prevents or at least limits radially expansion of the seal E when the seal E is axially compressed as occurs when the seal is biased into sealing engagement with the sealing face or seat 26 of body A. The seal E is preferably only partially axially inserted into the recess R4, i.e., a portion of the seal E lies axially outside the recess R4, but the body R2 of the retainer R completely encircles the portion of the seal E that is axially inserted therein.

The end wall R8 of retainer R defines a reaction surface for the spring or other biasing member F. Abutment of end wall R8 of retainer with shoulder 56 of stem B limits movement of the retainer R away from the distal end 50a of stem B and limits axial insertion of the seal E into the recess R4.

With continuing reference to FIGS. 5A and 5B, the bonnet D of faucet 10 comprises an integral spout C. It is preferred that the bonnet D and spout C be defined as a one-piece molded polymeric construction, but the bonnet and spout can be separate members that are assembled together. The spout C defines a dispensing bore 90, an inlet 92 to the bore 90 and an outlet 94 from the dispensing bore 90. The inlet 92 of dispensing bore 90 is located downstream from the outlet 24 of main bore 20 and downstream from the valve seat 26. As described below, liquid is dispensed by the faucet 10 via dispensing bore 90 of spout C.

In addition to the integral spout C, the bonnet D includes a first end D1 and a second end D2. As noted above, the first end D1 comprises a female bayonet mount 28b that mates with the male bayonet mount 28a of the body A. The second end D2 of the bonnet comprises a transverse end wall 72 that defines an aperture 74 through which the rod 50 of the stem B slidably extends so that at least the distal end 50a of rod 50 is located external to the bonnet D.

The bonnet D defines a hollow chamber 76 (see also FIG. 3B) that receives the stem B, retainer R, seal member E and spring or other biasing element F as shown in FIG. 5A. The distal end 50a of the rod 50 projects outwardly through the aperture 74 so that it is located outside the chamber 76. It is most preferred that the stem B be at least substantially non-rotatable relative to the bonnet D and also positionable only in a single orientation relative to the bonnet D. To this end, at least the portion of the rod 50 that moves slidably through the aperture 74 of the bonnet D is defined with a non-circular cross-section (see FIG. 5C) and the aperture 74 of bonnet D is formed with like or mating non-circular shape so that the rod 50 (and remainder of stem B) cannot rotate relative to the bonnet D and also so that the rod 50 can only be inserted through the aperture 74 in one angular orientation. Optionally, as shown herein, the aperture R10 of the retainer R and the portion of the rod 50 that slidably moves therethrough are also formed with mating non-circular shapes to prevent relative rotation between the rod 50 and retainer R.

The handle G of the faucet 10 is pivotably secured to the distal end 50a of the rod by a pin or a pivoting snap-fit, both of which are well-known in connection with other faucet structures. The handle G is manually movable from a first position as shown in FIGS. 5A and 5B to a second position as shown in FIG. 6B or a third position as shown in FIG. 6C. When moved to the second or third positions, a cam portion G2 of the handle G bears against the transverse wall 72 of bonnet D, and the shape of the cam portion G2 is such that when it bears against the wall 72, the rod 50 of stem B is pulled axially out of the chamber 76 via opening 74 so that the seal member E moves with the stem B away from the seat 26 to open the faucet 10 for dispensing liquid therefrom.

The spring or biasing element F is located in the chamber 76 between the wall 72 of bonnet D and the wall R8 of retainer R. As such, the biasing element F normally urges or biases the retainer R away from the wall 72. As noted, the wall R8 of the retainer R is engaged with the shoulder 56 of the stem B and, thus, the retainer R urges the stem B away from the wall 72 under force of spring F so that the seal E normally sealingly engages the sealing face 26 of the body A. The wall R8 of the retainer R is dimensioned and shaped so that minimal space is defined between it and the portions of the bonnet D defining the chamber 76 for all axial positions of the stem B. In this manner, the wall R8 of the retainer R captures the biasing member F in the chamber 76 so that any detached fragments of the biasing member F cannot escape the chamber 76 and enter the bore 90 of the spout C. Furthermore, owing to the presence of the retainer R and wall R8 thereof, and the close fit of retainer R in the chamber 76, the biasing member F is not in the liquid flow path that extends from the inlet 22 of body to the outlet 94 of spout C so that cleaning pulp or other solids from the faucet 10 is facilitated and risk of contamination is reduced.

Figure 6A:
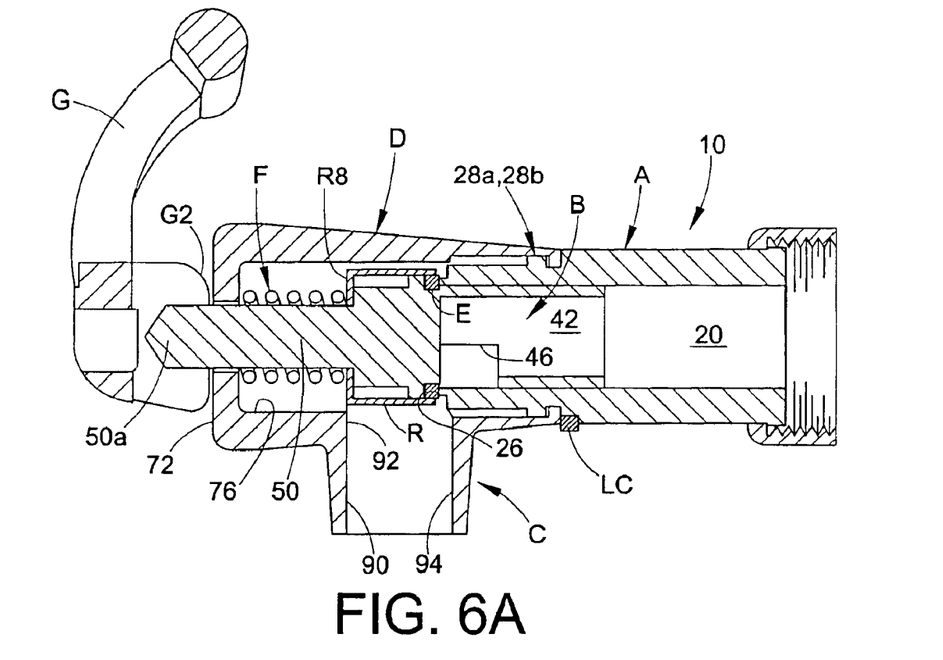
FIGS. 6A and 6B are sectional views of the faucet shown in FIGS. 1A and 1B, and respectively shown the faucet in a closed and an opened configuration.
Figure 6B:
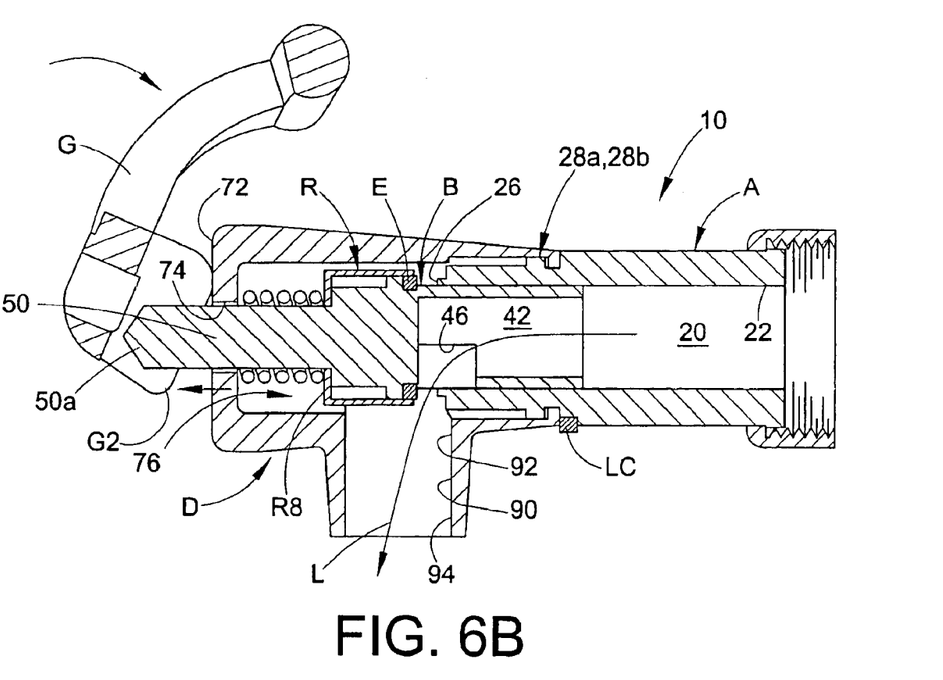
Figure 6C:
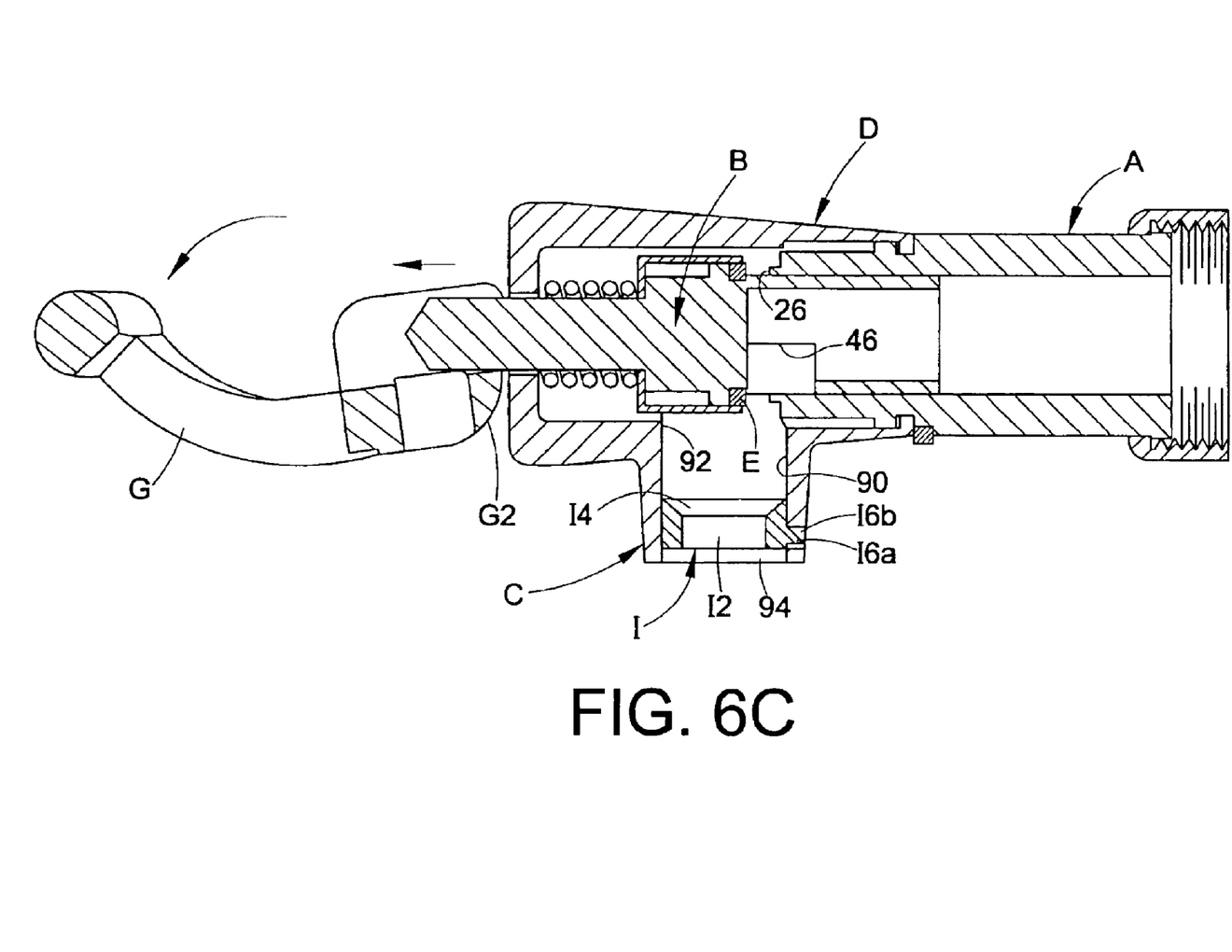
FIG. 6C shows the faucet of FIGS. 6A and 6B in an alternative opened position.

FIGS. 6A and 6B show the faucet 10 fully assembled and in closed (first operative) and opened (second operative) positions, respectively. The biasing member F (shown in FIG. 6A only for clarity) is illustrated as a metal or polymeric coil spring, but any other suitable biasing member can be used such as, e.g., a slug or other structure/element of elastomeric or other resilient material. In FIG. 6A, the faucet 10 is in its normally closed position owing to the biasing force of the spring F on the retainer R and stem B which, in turn, causes the seal member E to be sealingly engaged with the sealing face 26 of the body A. As such, liquid in the bore 20 of body A and bore 42 of stem is blocked from passage past the seat 26 into the outlet bore 90 of spout C. In contrast, when the handle G is moved to the second position shown in FIG. 6B or otherwise to pull the rod 50 of the stem B out of the chamber 76, the stem B is moved from its first operative position (FIG. 6A) to the second operative position (FIG. 6B) where the seal member E is axially spaced from the sealing face 26 and the aperture 46 of stem B is in fluid communication with the outlet bore 90 of the spout C so that liquid flowing into the bores 20,42 (indicated by the arrow L) flows through the aperture 46, to the inlet 92 of the bore 90 and exits the faucet 10 through the outlet 94 of the bore 90. The handle G can also be moved to a third position shown in FIG. 6C to move the stem B into its second operative (opened) position for dispensing liquid from the faucet 10.

The cam G2 of the handle G is shaped such that when the handle G is moved from the first position (FIG. 6A) to the second position (FIG. 6B), the faucet is self-closing in that upon release of the manual force under which the handle was moved, the spring F biases the stem B and handle G back to their respective first operative positions. On the other hand, when the handle G is moved from the first position to the third position (FIG. 6C), the cam G2 of the handle G is shaped so that the handle moves "over-center" and is locked into the third position and must be moved manually at least partially in the opposite direction to close the faucet 10.

Those of ordinary skill in the art will recognize that when the stem B moves from the second operative (opened) position back to its normally-closed (first operative) position, the close sliding fit of the male portion 40 of stem B in the bore 20 of body A results in a shearing action adjacent seat 26 and aperture 46 whereby any accumulated pulp, crystals or other solids are dislodged so that the seal member E is able to form a true fluid-tight seal with the sealing face 26 and so that the pulp or other solids do not inhibit full movement of the stem B fully to its normally-closed position.

As noted above, the stem B is restrained against rotation and must be installed in only a single select orientation. This arrangement is preferred because the aperture 46 of the stem B is preferably oriented relative to the inlet 92 of the spout bore 90 so that these openings directly communicate with each other when the stem is moved to its opened position (FIGS. 6B,6C). While only one aperture 46 is shown, it is contemplated that multiple apertures 46 forming a diffuser or the like be used.

As shown in FIG. 6C, the faucet 10 optionally comprises a flow-control insert I installed into the bore 90 of spout C. The flow control insert I comprises an annular molded plastic member or the like that is closely held in the bore 90 by a friction-fit, adhesive or otherwise. The insert I defines a select flow path or bore 12 that is dimensioned and/or shaped differently as compared to the bore 90 of spout C to control liquid-flow characteristics as desired or required for a particular application. In the illustrated embodiment, the insert I comprises a tapered inner end 14 that diverges moving into the bore 90. This tapered surface 14 is sometimes preferred so that liquid, pulp and the like are not trapped in the bore 90 by the insert I, but the surface 14 can also be squared-off or transverse relative to the axis of the bore 90. As shown, the insert I further comprises a radial projection 16a that is received into a mating opening 16b defined by spout C (the opening 16b is not shown in FIGS. 3B,5A,5B,6A,6B in order to simplify the drawings).

Figure 7A:
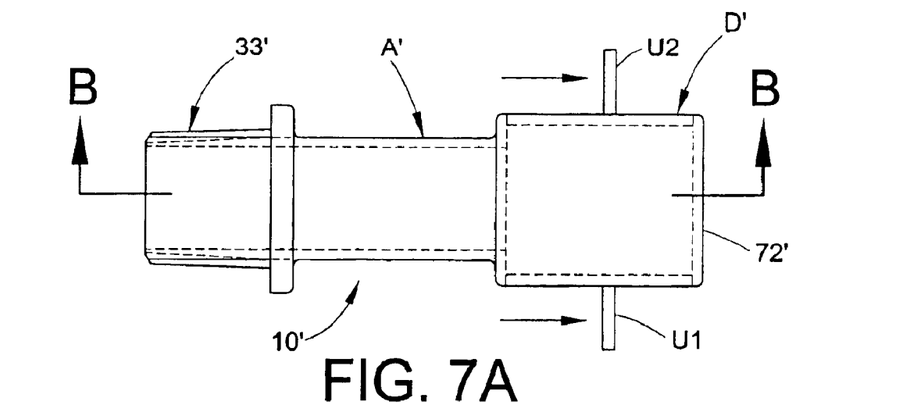
FIG. 7A is a top plan view of an faucet formed in accordance with an alternative embodiment of the present invention.
Figure 7B:
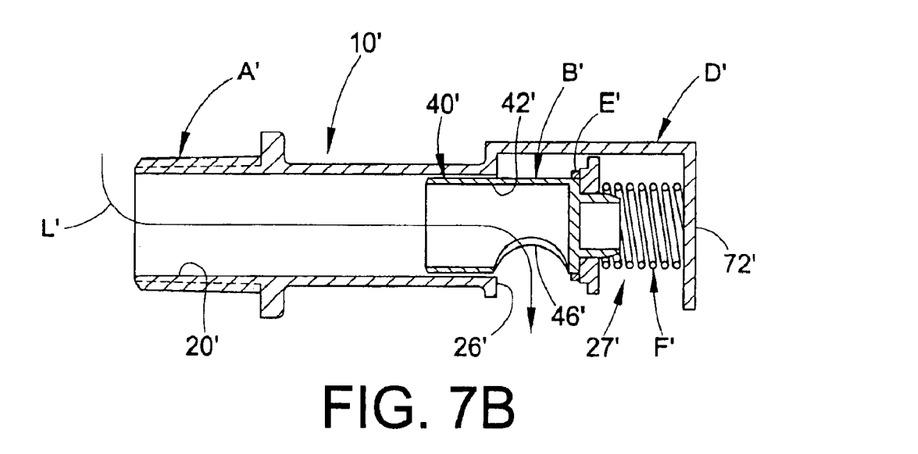
FIG. 7B is a section view of the faucet shown in FIG. 7A as taken along line B—B.

FIGS. 7A and 7B illustrate an alternative faucet 10' that is identical to the faucet 10 except as otherwise shown and described. As such, like components are identified with like reference numerals and letters that include a primed (') designation. The faucet 10' comprises a body A' with an integral bonnet D' (the body A' and bonnet D' are preferably defined as a one-piece construction). The body A' defines external threads 33' for connection to an associated liquid container or includes a nut rotatably supported thereon for connection to the associated liquid container.

The body A' includes a bore 20' and sealing face 26' as described above, and also defines an outlet opening 27'. A first portion 40' of a stem B' is closely slidably received in the bore 20'. The first portion 40' defines a bore 42' that communicates with the bore 20' of body A'. The first portion 40' also defines an aperture 46' that intersects the bore 42' to provide an outlet therefrom. The stem B' includes first and second tabs U1,U2 that are connected to and project outwardly from opposite lateral sides of the first portion 40'. These tabs U1,U2 are adapted to be manually engaged by a user's first and second fingers while the user's thumb is engaged with the end wall 72' of bonnet D'. The tabs U1,U2 also act as a stop flange and a flange against which the seal member E' is positioned and also prevent rotation of stem B' relative to body A'.

Figure 7C:
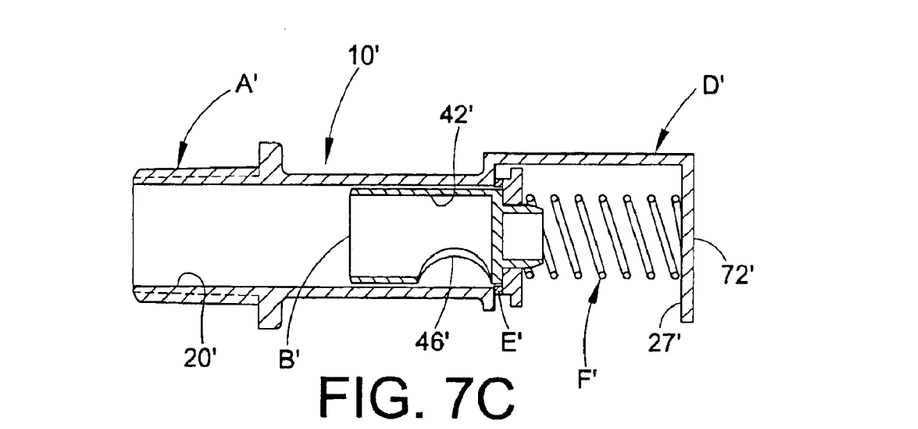
FIG. 7C is identical to FIG. 6B but shows the faucet in its closed state.

A space is defined between the stem B' and the end wall 72', and a spring or other biasing member F' spans this space and normally urges the stem B' away from the wall 72' so that the first portion 40' of stem B' is fully inserted in the bore 20' and the seal member E' is firmly engaged with the sealing face 26' (FIG. 7C). As shown in FIG. 7B, the stem B' is manually movable against the biasing force of spring F' by application of manual force to the tabs U1,U2 so that the stem B' moves to an opened position where the seal member E' is spaced from the sealing face 26' so that liquid can flow from the bore 20', into the bore 42', through the aperture 46', and out of the outlet opening 27' of body A' as shown by arrow L'. Upon release of the manual opening force, the spring F' causes the stem B' to move axially away from the wall 72' so that the first portion 40' of stem B' is once again fully inserted into the bore 20' and the seal E' is firmly sealingly engaged with the sealing face 26'. Here, again, the close sliding movement of the first stem portion 40' into the bore 20' results in a shearing action that clears solids such as pulp, crystals or the like from the region of the aperture 46' and sealing face 26' in order to facilitate fluid-tight engagement between the seal E' and the seat 26'.

When the seal member E,E' is engaged with the seat 26,26', only a minimal portion of the seal E,E' is exposed to and in contact with the liquid being dispensed. As such, even if liquid remains in the bore 42,42' for an extended period of time, the seal E,E' will not meaningfully alter the taste or other characteristics of the liquid.

Figure 8A:
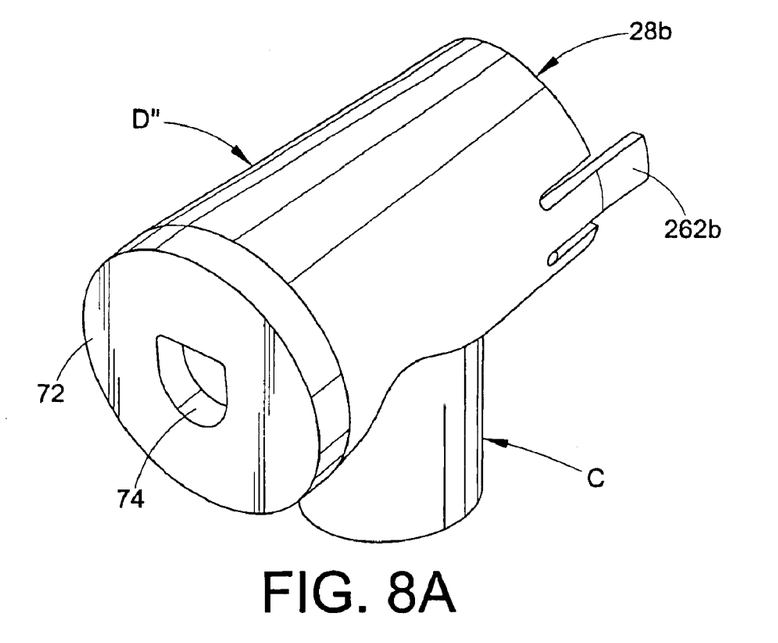
FIGS. 8A and 8B are front and rear isometric views of an alternative bonnet formed in accordance with the present invention.
Figure 8B:
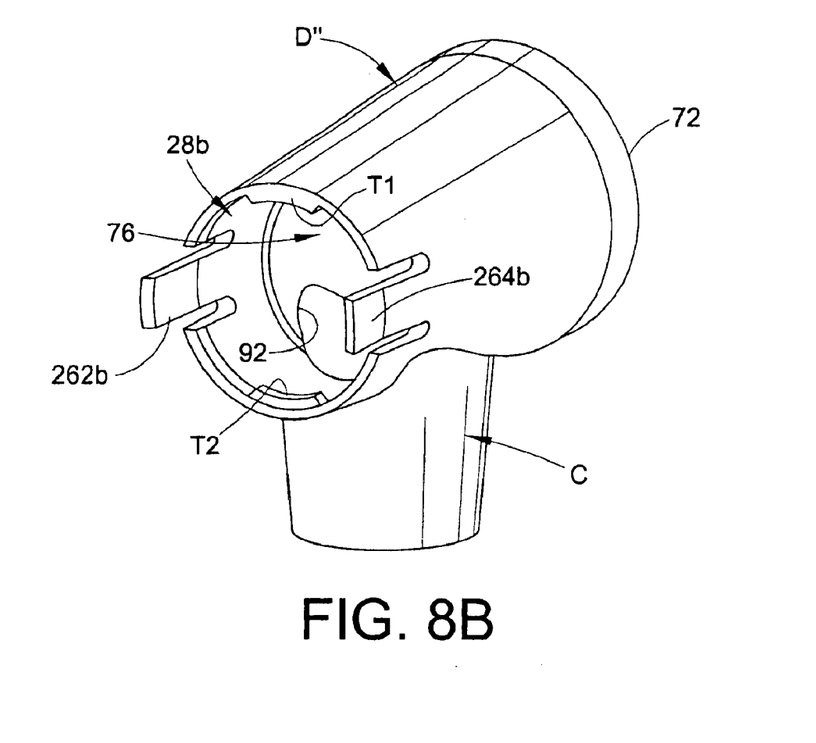

An alternative bonnet D" is illustrated in FIGS. 8A and 8B and is freely useable in place of the bonnet D to assemble a faucet 10 in accordance with the present development. Except as otherwise shown and/or described herein, the bonnet D" is identical to the bonnet D and like components are numbered accordingly. The bonnet D" is adapted to mate selectively with the body A as described in connection with the bonnet D. As such, the bonnet D" comprises a female bayonet mount 28b including the first and second tabs T1,T2 for mating with the male bayonet mount 28a of the body A. Unlike the bonnet D, however, the bonnet D" does not include first and second notches corresponding to the notches 62b,64b of the body D. Instead, the bonnet D" comprises first and second outwardly projecting resilient fingers 262b,264b that are located so that when the bonnet D" is mated to a body A, the resilient fingers 262b,264b are closely received in the notches 62a,64a of the body and lock the bonnet D" to the body A without requiring use of a separate locking clip LC. To remove the bonnet D", the fingers 262b,264b are resiliently expanded sufficiently to allow relative rotation between the bonnet D" and body A. Defining the bonnet D" and fingers 262b,264b as a one-piece molded plastic construction has been found to be a suitable structure for defining the resilient fingers 262b,264b.

Modifications and alterations will occur to those of ordinary skill in the art upon reading the foregoing detailed description. It is intended that the following claims be construed literally and/or according to the doctrine of equivalents as broadly as possible so as to encompass all such modifications and alterations.

What is claimed is:

1. A faucet comprising:
   a body comprising: (i) a main bore; and, (ii) a sealing face;
   a stem comprising a first portion that defines a flow path and a second portion defining an actuator rod, wherein said flow path communicates with said main bore, said stem being slidable between first and second positions relative to said body, wherein said sealing face of said body encircles an outlet opening of said main bore and wherein said first portion of said stem is closely slidably received in said outlet opening of said main bore so that said first portion of said stem is cleaned by shearing action with said body when said stem moves from said second position to said first position;
   a seal that moves with said stem between said first and second positions, wherein said seal engages said sealing face of said body when said stem is located in said first position to block liquid flow from said main bore of said body and from said flow path, and wherein said seal is spaced from said sealing face when said stem is located in said second position to allow liquid flow from said flow path and said main bore;

a bonnet releasably connected to said body, wherein said bonnet comprises a hollow chamber and a dispensing snout bore, wherein said flow path of said stem in is communication with said dispensing spout bore when said stem is located in said second position, and wherein said seal blocks communication between said dispensing spout bore and said flow path of said stem when said stem is located in said first position, said actuator rod of said stem extending through said chamber and through an aperture defined in a transverse end wall of said bonnet so that a distal end of said actuator rod is located external to said chamber;

a biasing element surrounding said actuator rod and acting between said transverse end wall of said bonnet and said stem to bias said stem into said first position; and, a handle pivotally connected to said distal end of said stem to receive manual input force, wherein said handle comprises a cam portion that bears against said end wall of said bonnet when said handle is pivoted relative to said bonnet from a first position to a second position to pull said actuator rod outwardly through said aperture of said transverse end wall of said bonnet, said second position of said handle corresponding to said second position of said stem so that said stem is movable in response to movement of said handle.

2. The faucet as set forth in claim 1, wherein said bonnet and said body respectively define mating first and second portions of a bayonet mount structure, and wherein said bonnet is releasably connected to said body when said first portion of said bayonet structure is mated to said second portion of said bayonet structure.

3. The faucet as set forth in claim 2, further comprising a locking clip releasably engaged with both said bonnet and said body when said bonnet is connected to said body, wherein said locking clip inhibits unintended decoupling rotation of said bonnet relative to said body.

4. The faucet as set forth in claim 2, wherein said bonnet comprises first and second resilient fingers projecting outwardly therefrom, wherein said first and second fingers resiliently engage first and second portions of said body when said bonnet is connected to said body to inhibit unintended decoupling rotation of said bonnet relative to said body.

5. The faucet as set forth in claim 1, wherein said biasing element comprises a coil spring or a resilient elastomeric element.

6. The faucet as set forth in claim 1, wherein said body rotatably supports a nut that is adapted to mate threadably with an associated fitment of an associated fluid container.

7. The faucet as set forth in claim 1, wherein said body comprises threads for mating with an associated fitment of an associated fluid container.

8. The faucet as set forth in claim 1, wherein said seal comprises at least one of a resilient O-ring and a resilient flat washer.

9. The faucet as set forth in claim 1, wherein said flow path comprises an inlet and an outlet, wherein said inlet and outlet are defined by separate, spaced-apart openings in said first portion of said stem.

10. A faucet comprising:

a body comprising: (i) a main bore; and, (ii) a sealing face;

a stem comprising a first portion that defines a flow path, wherein said flow path communicates with said main bore, said stem being slidable between first and second positions relative to said body;

a bonnet connected to said body, wherein said bonnet comprises a hollow chamber through which at least a second portion of said stem extends;

a seal that encircles said stem and that moves with said stem between said first and second positions, wherein said seal engages said sealing face of said body when said stem is located in said first operative position to block liquid flow from said main bore of said body and from said flow path, and wherein said seal is spaced from said sealing face when said stem is located in said second position to allow liquid flow from said flow path and said a biasing element that resiliently biases said stem into said first position;

a handle operably engaged with said stem to receive manual input force, wherein said stem is movable in response to movement of said handle;

a spout defining a dispensing bore located downstream from said flow path, wherein said flow path in is communication with said dispensing bore when said stem is located in said second position, and wherein said seal blocks communication between said dispensing bore and said flow path when said stem is located in said first position;

a seal retainer located in said hollow chamber of said bonnet, said seal retainer conformed to limit radial expansion of said seal by comprising a cylindrical recess into which said seal is at least partially axially received.

11. The faucet as set forth in claim 10, wherein said second portion of said stem extends through said cylindrical recess of said seal retainer.

12. The faucet as set forth in claim 11, wherein said seal retainer is abutted with said stem and wherein said biasing element is operably engaged between said bonnet and said seal retainer.

13. The faucet as set forth in claim 12, wherein said seal retainer isolates said biasing element from said dispensing bore.

14. A faucet comprising:

a body comprising: (i) a main bore; and, (ii) a sealing face;

a stem comprising a first portion that defines a flow path and a second portion that defines an actuator rod, wherein said flow path communicates with said main bore, said stem being slidable between first and second positions relative to said body;

a bonnet connected to said body, wherein said bonnet comprises a hollow chamber through which said actuator rod portion of said stem extends, said bonnet defining a transverse end wall including an aperture through which said rod portion of said stem extends to a distal end of said rod located externally of said hollow chamber;

a seal that moves with said stem between said first and second positions, wherein said seal engages said sealing face of said body when said stem is located in said first operative position to block liquid flow from said main bore of said body and from said flow path, and wherein said seal is spaced from said sealing face when said stem is located in said second position to allow liquid flow from said flow path and said main bore;

a biasing element that resiliently biases said stem into said first position;

a handle operably engaged with said distal end of said rod of said stem to receive manual input force, wherein said stem is movable in response to movement of said handle;

a spout defining a dispensing bore located downstream from said flow path, wherein said flow path in is communication with said dispensing bore when said stem is located in said second position, and wherein said seal blocks communication between said dispensing bore and said flow path when said stem is located in said first position, wherein said aperture defined in said end wall of said bonnet defines a non-circular shape, and said actuator rod of said stem defines a non-circular shape that is slidably received in said aperture so that said stem is restrained against rotation relative to said bonnet by a non-rotational relationship of said actuator rod in said end wall aperture.

* * * * *